United States Patent [19]

Luciani et al.

[11] Patent Number: 5,278,117

[45] Date of Patent: Jan. 11, 1994

[54] SUPPORTED CATALYST FOR ETHYLENE POLYMERIZATION AND THE COPOLYMERIZATION OF ETHYLENE WITH ALPHA-OLEPHINS, ITS PREPARATION AND USE

[75] Inventors: Luciano Luciani, Ferrara; Renzo Invernizzi; Francesco Masi, both of Milan; Maddalena Pondrelli, Bologna; Mario Polesello, Treviso; Italo Borghi, Ferrara, all of Italy

[73] Assignee: Montedipe S.r.l., Milan, Italy

[21] Appl. No.: 666,587

[22] Filed: Mar. 8, 1991

[30] Foreign Application Priority Data

Mar. 16, 1990 [IT] Italy ............................ 19698 A/90
Sep. 18, 1990 [IT] Italy ............................ 21503 A/90

[51] Int. Cl.$^5$ ...................... C08F 4/654; C08F 10/00
[52] U.S. Cl. ........................... 502/113; 502/120; 502/127; 502/119; 502/134; 526/114; 526/125; 526/909
[58] Field of Search ............... 502/113, 119, 120, 127, 502/134

[56] References Cited

U.S. PATENT DOCUMENTS

| | | | |
|---|---|---|---|
| 4,175,170 | 11/1979 | Schweier et al. | 526/119 |
| 4,192,772 | 3/1980 | Berger et al. | 252/429 C |
| 4,296,223 | 10/1981 | Berger | 526/125 |
| 4,354,009 | 10/1982 | Goeke | 526/125 |
| 4,359,561 | 11/1982 | Fraser et al. | 526/88 |
| 4,370,456 | 1/1983 | George | 526/125 |
| 4,379,758 | 4/1983 | Wagner | 526/88 |
| 4,383,095 | 5/1983 | Goeke et al. | 526/88 |
| 5,024,982 | 6/1991 | Hawley et al. | 502/110 |

FOREIGN PATENT DOCUMENTS 0164596 12/1985 European Pat. Off.
0281524 9/1988 European Pat. Off.

*Primary Examiner*—Edward J. Smith
*Attorney, Agent, or Firm*—Shea & Gould

[57] ABSTRACT

A supported Ziegler-Natta catalyst active in ethylene polymerization and in the copolymerization of ethylene with alpha-olefins consists of:

(A) a cocatalyst in the form of an organometallic compound of aluminium, and (B) a solid catalyst component obtained by:

(i) impregnating a granular solid support with a solution of a titanium alcoholate and magnesium chloride in a liquid aliphatic hydrocarbon, followed by evaporation of the hydrocarbon solvent;

(ii) impregnating the support treated in (i) with a solution of magnesium chloride in a liquid aliphatic ester, followed by evaporation of the ester solvent; and (iii) activating the support treated in (ii) by contact with an alkyl aluminium halide.

In a preferred embodiment, measured quantities of a silicon halide are introduced in stage (i) and/or (ii), this considerably improving catalytic activity. In a particular embodiment, zirconium or hafnium are introduced into the solid catalyst component (B) in addition to titanium, to obtain catalysts able to produce polyethylenes with a widened molecular weight distribution.

26 Claims, No Drawings

SUPPORTED CATALYST FOR ETHYLENE POLYMERIZATION AND THE COPOLYMERIZATION OF ETHYLENE WITH ALPHA-OLEPHINS, ITS PREPARATION AND USE

This invention relates to a supported catalyst for ethylene polymerization and the copolymerization of ethylene with alpha-olefins, its preparation and use.

It is known that ethylene or general alpha-olefins can be polymerized by the low pressure process using Ziegler-Natta catalysts. These catalysts are generally formed from a compound of group IV to group VI elements of the periodic table (transition metal compounds) mixed with an organometallic compound or hydride of group I to group III elements of the periodic table.

The known art comprises Ziegler-Natta catalysts in which the transition metal compound is fixed to a solid support, such as a magnesium halide. For example, U.S. Pat. 4,296,223 describes a solid catalyst component obtained by interacting magnesium dichloride, a titanium alcoholate and an aluminium chloride, and U.S. Pat. No. 4,192,772 describes a solid catalyst component obtained by interacting a magnesium compound, a titanium compound, a zirconium compound and an aluminium halide. These catalysts normally allow olefinic polymers to be obtained with a narrow and wide molecular weight distribution respectively, but do not enable the polymer to be obtained directly in the form of flowable granules. Solid catalyst components are also known in the art obtained by activating with an aluminium halide a complex containing magnesium, titanium, halogen, alkoxy groups and an electron donor. Such a complex can be deposited on a support, particularly a porous support, and then activated to provide solid catalyst components particularly suitable for the polymerization or copolymerization of ethylene in the gaseous phase. For this known art reference should be made to the descriptive part of U.S. Pat. Nos. 4,354,009, 4,359,561, 4,370,456, 4,379,758 and 4,383,095. These supported catalysts enable polyethylenes to be obtained in flowable granular form, however problems often arise deriving from the poor rheology of the polymer because of the presence of fines, and the friability of the granules. A further problem is the unsatisfactory productivity in terms of the quantity of polymer obtained per unit weight of catalyst. This probably derives from the difficulty of depositing the catalyst components on the support in highly active form. Finally, known catalysts are generally insufficiently flexible for use in the production of olefinic polymers with differing characteristics, according to requirements.

According to the present invention it has now been found possible to obtain a solid catalyst component and a catalyst which are highly active in suspension or gaseous-phase polymerization, and are able to produce ethylene polymers and copolymers of ethylene with alpha-olefins in the form of flowable granules having excellent morphology. Specifically, the present invention is based on the discovery that magnesium chloride can be deposited in highly active amorphous form on a porous support by two separate partial impregnations, from a solution of magnesium chloride in aliphatic hydrocarbon and in aliphatic ester respectively. It has also been found that such a catalyst can produce ethylene polymers with a molecular weight distribution varying from narrow to wide by simple modifications introduced into the catalyst.

In accordance therewith the present invention provides a supported Ziegler-Natta catalyst active in ethylene polymerization and in the copolymerization of ethylene with alpha-olefins, consisting of:

(A) a cocatalyst in the form of an organometallic compound of aluminium, and
(B) a solid catalyst component containing titanium, magnesium, chlorine and alkoxy groups on a support, with a molar ratio of titanium to magnesium of between 1:1 and 1:6 and a titanium content of between 1 and 9% by weight (expressed as metal), obtained by:
  (i) impregnating a granular porous solid support with a solution of magnesium chloride $MgCl_2$ and a titanium tetraalcoholate $Ti(OR)_4$ (where R is a linear or branched $C_1$-$C_5$ alkyl radical) in a molar ratio of between 0.1:1 and 0.5:1, in a liquid aliphatic hydrocarbon, followed by evaporation of the hydrocarbon solvent, in order to deposit on the support a complex of formula $Ti(OR)_4 \cdot (0.1$–$0.5)MgCl_2$;
  (ii) impregnating the support treated in (i) with a solution of magnesium chloride in a liquid aliphatic ester, followed by evaporation of the solvent, to obtain on completion of the operation the deposition on the support of a complex of formula $Ti(OR)_4 \cdot (1$–$6)MgCl_2$; and
  (iii) activating the support treated in (ii) by contact with an alkylaluminium chloride, operating at a temperature of between 10° and 100° C. for a time of between 10 minutes and 24 hours. According to a preferred embodiment, in stage (i) and/or (ii) a silicon halide is additionally added in a quantity to obtain an atomic ratio of the silicon in said silicon halide to the titanium in the titanium tetraalcoholate of between 0.5:1 and 8:1. In the best embodiment the silicon halide is added in stage (ii) in a quantity to obtain a silicon:titanium atomic ratio of between 2.0:1 and 6.0:1. The use of the silicon halide unexpectedly improves the catalyst activity, even in polymerizations conducted with very large hydrogen quantities, in the production of polyethylenes with a high melt flow index.

The organometallic aluminium compound forming the cocatalyst (A) is conveniently chosen from trialkylaluminiums, alkylaluminium hydrides and alkylaluminium halides (especially chlorides) containing from 1 to 5 carbon atoms in the alkyl portion. Trialkylaluminiums with from 2 to 4 carbon atoms in the alkyl portion are preferred, such as triethylaluminium, tributylaluminium and triisobutylaluminium.

The support for the solid catalyst component (B) is chosen from granular, preferably spherical, porous solids with a mean particle size of the order of microns and a narrow particle size distribution. The supports can be organic, such as olefinic or styrene polymers, or inorganic such as silica or aluminium. Microspheroidal silica (size 20–100 $\mu$) is preferred with a BET surface area of between 150 and 400 $m^2/g$, a total porosity > 80% and a mean pore radius of between 50 and 200 Å. Such a silica can be either used as such or be previously activated. The activation can be effected by heating the silica in an inert atmosphere to a temperature of between about 100° C. and about 650° C. for a time of between 1 and 20 hours, or by bringing the silica into contact with an organometallic compound such as an alkylmagnesium or an alkylaluminium, such as butylmagnesium, butyl octylmagnesium or triethylaluminium, operating at ambient or higher than ambient temperature, for example 60° C. According to a preferred embodiment the silica is activated by treatment with butyl octylmagnesium in a quantity of the order of 10-20% of the silica by weight.

According to the present invention such a support is impregnated [stage (i)] with a solution of titanium tetraalcoholate Ti(OR)$_4$ and magnesium chloride dissolved in a liquid aliphatic hydrocarbon solvent. Preferred examples of of titanium tetraalcoholates Ti(OR)$_4$ are tetra n-propoxytitanium, tetra n-butoxytitanium, tetra i-propoxytitanium and tetra i-butoxytitanium. The magnesium chloride used for the purpose is an anhydrous or substantially anhydrous magnesium chloride (water content less than 1% by weight). Solvents suitable for the purpose are aliphatic hydrocarbons liquid under normal temperature conditions, such as pentane, hexane, heptane, octane, nonane and decane. The lower-boiling solvents such as pentane, hexane and heptane are preferred, as they can be removed by evaporation at relatively low temperature.

According to the present invention, a solution containing between 0.1 and 0.5 moles of magnesium chloride per mole of titanium tetraalcoholate is prepared. The solution concentration is not critical, but a total concentration of the two compounds of the order of 5-10% by weight is convenient. The support is impregnated with the solution at a temperature between 40° and 100° C. and preferably at the solvent reflux temperature (for solvents with a suitable boiling point), for a time normally of between 1 and 5 hours. The solution quantity used in the impregnation is such as to have on the support between 1 and 9% by weight and preferably between 3 and 7% by weight of titanium (considered as metal) in the solid catalyst component finally obtained.

After impregnation the hydrocarbon solvent is removed by evaporation, operating at a temperature not exceeding about 60° C., possibly under reduced pressure. After this treatment a granular solid is obtained consisting of the support on which a complex definable by the formula Ti(OR)$_4$.(0.1-0.5)MgCl$_2$ is deposited. This solid is impregnated [stage (ii)] with a solution of magnesium chloride in an aliphatic ester. Aliphatic esters suitable for this purpose are chlorinated or non-chlorinated methyl and ethyl aliphatic esters of lower aliphatic carboxylic acids, such as ethyl formate, methyl acetate, ethyl acetate, propyl acetate, isopropyl acetate and ethyl chloroacetate. The preferred solvent is ethyl acetate. Specifically, a solution with a magnesium chloride content preferably of the order of 5 g/l is used, the impregnation being carried out at a temperature of 50°-75° C. for a time of the order of 1-5 hours. The quantity of solution used is such that the complex deposited on the support is definable by the formula Ti-(OR)$_4$.(1-6)MgCl$_2$ after eliminating the solvent. In the preferred embodiment the deposited complex is definable as Ti(OR)$_4$.(1-3)MgCl$_2$, so that the molar ratio of titanium to magnesium in the solid catalyst component is between 1:1 and 1:3. The aliphatic ester is conveniently evaporated at a temperature not exceeding about 50° C., possibly under reduced pressure. The evaporation is preferably controlled to only partly evaporate the ester, to maintain in the deposited complex an ester quantity of up to 20% and preferably of the order of 5-10% of the weight of the magnesium chloride. It has been found that, on X-ray diffractometer analysis, using for this purpose a power diffractometer with CuK$_{\alpha 1}$ radiation transmission, the solid obtained at the end of stage (ii) shows a clear characteristic peak at about 7 degrees 2$\theta$. It is considered that this peak originates from a product of crystallographic interaction of the ester on the magnesium chloride lattice. This peak is still present in the solid catalyst component (B) obtained at the end of stage (iii). It has been found that solid catalyst components (B) having the described peak are highly active in ethylene polymerization and in the copolymerization of ethylene with alpha-olefins, whereas the catalyst components without this peak show a lesser polymerization activity.

In preparing the solid catalyst component (B) of the present invention, the order of execution of stages (i) and (ii) can be reversed, while still obtaining useful results.

According to a preferred embodiment of the present invention a silicon halide chosen from silicon tetrahalides and halosilanes is added in stage (i) and/or stage (ii). Conveniently, the silicon halide is added in the form of a solution in the hydrocarbon solvent and/or ester, together with the other components, in the aforestated quantities. Examples of these components are silicon tetrachloride, trichlorosilane, vinyl trichlorosilane, trichloroethoxy silane and chloroethyl trichlorosilane. Silicon tetrachloride is preferred.

According to the present invention, the support obtained after stages (i) and (ii) is activated [stage (iii)] by contact with an alkylaluminium chloride to obtain the solid catalyst component (B). Conveniently, the treated support from stage (ii) is brought into contact with a solution of an alkylaluminium chloride in an aliphatic hydrocarbon, with a ratio of chlorine atoms in the alkylaluminium chloride to alkoxy groups in the solid of between 0.5:1 and 7:1. The procedure is carried out at a temperature of between 10° and 100° C. for a time which, depending on the temperature used, varies from 10 minutes to 24 hours. Suitable alkylaluminium chlorides for this purpose include diethylaluminium chloride, ethylaluminium sesquichloride and isobutylaluminium chloride. The solvents can be chosen from the liquid aliphatic hydrocarbons stated in the description of stage (i). The preferred embodiment uses a temperature of between 20° and 90° C. with a time of between 15 minutes and 2 hours. After treatment the activated solid catalyst component is recovered, then conveniently washed with a liquid aliphatic hydrocarbon solvent until there is no chloride in the wash liquid.

The solid catalyst component (B) of the present invention is a granular solid consisting generally of between 40 and 85% by weight of support, the remainder being the catalytically active part containing titanium, magnesium, chlorine, alkoxy groups and possibly aliphatic ester, with a molar ratio of titanium to magnesium of between 1:1 and 1:6, a titanium content of between about 1 and about 9% of the total weight of component (B), and an aliphatic ester content of between 0 and 20% of the weight of the magnesium chloride used.

Preferably the support quantity varies from 55 to 80% by weight, the molar ratio of titanium to magnesium varies from 1:1 to 1:3, the titanium content varies from 3 to 7% of the weight of component (B) and the aliphatic ester quantity is of the order of 5-10% of the weight of the magnesium chloride. The preferred support is pretreated or non-pretreated microspheroidal silica having the aforesaid characteristics.

The catalysts of the present invention have an atomic ratio of aluminium in the cocatalyst (A) to titanium in the solid catalyst component (B) generally between 200:1 and 20:1, and preferably between 150:1 and 50:1.

Operating in the aforesaid manner, solid catalyst components and catalysts are obtained which are particularly active in the production of high density ethylene polymers with a narrow medium molecular weight distribution, and active in the production of ethylene/alpha-olefin copolymers with low density (LLDPE).

The catalyst of the present invention can also be modified to make it suitable for the production of polyethylenes with a wider molecular weight distribution. Generally, such a modification consists of introducing into the solid catalyst component active centres of a transition metal other than titanium. In practice, such a result is obtained by contacting the support in stage (i) with a solution which in addition to the other components contains a zirconium or hafnium compound, normally chosen from zirconium or hafnium halides, alcoholates and haloalcoholates. Compounds suitable for this purpose are zirconium tetrachloride, hafnium tetrachloride, tetrabutoxy zirconium, tetrabutoxy hafnium, dichloro dibutoxyzirconium and dichloro dibutoxy hafnium. The treatment conditions for the support are those described for stage (i) and the quantity of zirconium or hafnium compound used is such as to obtain a molar ratio of [Ti+Zr (or Hf)] to Mg of between 1:1 and 1:6 and preferably between 1:1 and 1:3, and a molar ratio of Ti to Zr (or Hf) of between 1:0.5 and 1:2 and preferably between 1:1 and 1:2. At the end of the treatment the solvent is eliminated in the manner already described in relation to stage (i).

Thus using the catalysts of the present invention, high density ethylene polymers (density between about 0.96 and about 0.95 g/ml) can be prepared with a molecular weight distribution from narrow to wide (Mw/Mn from about 4 to more than 14). In addition the catalysts are sensitive to alpha-olefinic comonomers and allow copolymers of ethylene with an alpha-olefin to be prepared having a density from medium to low (density from about 0.94 to about 0.92 g/ml). Alpha-olefins suitable for this purpose are those containing from 3 to 10 carbon atoms and preferably from 4 to 6 carbon atoms, such as 1-butene, 1-hexene and 4-methyl-1-pentene. The catalysts are also sensitive to hydrogen, thus allowing simple molecular weight adjustment (melt flow index at 2.16 kg from about 0.0 to about 50 g/10 min).

The catalysts of the present invention can be used in polymerization by the method of suspension in an inert diluent, or by the gaseous phase, fluidized bed or agitated method. The general polymerization conditions are: temperature between 50° and 110° C., total pressure between 5 and 40 bar, and a ratio of hydrogen partial pressure to ethylene partial pressure of between 0 and 10. In all cases a high olefinic polymer productivity is obtained (productivity of the order of 2-10 kg of polymer per gram of solid catalyst component), having an excellent rheology and in particular being in the form of non-friable granules (with a size generally of the order of 1000–1500 $\mu$) and free of fines.

The following experimental examples are provided to better illustrate the present invention. In these examples the support for the solid catalyst component is a microspheroidal silica in the form of particles with a mean diameter of 40 $\mu$, having the following characteristics:

| apparent density: | 0.27 g/ml |
|---|---|
| surface area (BET): | 307 m$^2$/g |
| total porosity: | 92.6% |
| mean pore radius: | 132 Å |

In Examples 1–6, such a silica is activated before use by heating to about 600° C. for a time of about 10 hours in a nitrogen atmosphere. In Example 13 the silica is used as such (unactivated). In Examples 14–16 the silica is used activated with magnesium butyloctyl under the stated conditions.

EXAMPLE 1 (comparison)

5.61 g (16.5 mmoles) of tetra n-butoxytitanium, 0.78 g (8.24 mmoles) of magnesium chloride and 100 ml of anhydrous n-heptane are fed under a nitrogen atmosphere into a 250 ml flask fitted with a reflux condenser, mechanical stirrer and thermometer. The mixture is heated to reflux temperature (about 95° C.) for 1 hour to completely dissolve the magnesium chloride.

10 g of activated silica are introduced into the solution and left in contact for 2 hours under reflux conditions (about 95° C.). The system is then evaporated to dryness by evaporating the solvent, to recover a solid which is suspended in 53 ml of n-hexane and the suspension brought into contact with 13 ml of a 40 wt % solution of aluminium ethyl sesquichloride (4.26 g, 17.2 mmoles) in n-decane. It is left in contact for 15 minutes at a temperature of 25° C., after which the solid is recovered and washed with anhydrous hexane until no chloride is present in the wash liquid, after which it is dried under reduced pressure.

16 g of a catalyst component are obtained in the form of microspheroidal solid, containing 61% by weight of SiO$_2$ and having a Mg:Ti atomic ratio of 1:2.

EXAMPLE 2 (comparison)

5.61 g (16.5 mmoles) of tetra n-butoxytitanium, 0.78 g (8.24 mmoles) of magnesium chloride and 100 ml of anhydrous n-heptane are fed under a nitrogen atmosphere into a 250 ml flask fitted with a reflux condenser, mechanical stirrer and thermometer. The mixture is heated to reflux temperature for 1 hour to completely dissolve the magnesium chloride.

10 g of activated silica are introduced into the solution and left in contact for 2 hours under reflux conditions. The system is then evaporated to dryness by evaporating the solvent, to recover a solid which is suspended in 52 ml of a 2 vol % solution of titanium tetrachloride (1.04 g, 5.5 mmoles) in n-hexane and allowed to react for 1 hour at 60° C.

The system is then evaporated to dryness by evaporating the solvent, to recover a solid which is suspended in 53 ml of n-hexane and the suspension brought into contact with 13 ml of a 40 wt % solution of aluminium ethyl sesquichloride (4.26 g, 17.2 mmoles) in n-decane. It is left in contact for 15 minutes at a temperature of 25° C., after which the solid is recovered and washed, after which it is dried under reduced pressure, as described in Example 1.

17 g of a catalyst component are obtained in the form of microspheroidal solid, containing 17.4% by weight of SiO$_2$ and having a Mg:Ti atomic ratio of 1:2.5.

EXAMPLE 3 (comparison)

Example 2 is repeated but with the difference that 100 ml of titanium tetrachloride are used. After heating to 60° C. for 1 hour, the solid is filtered, washed repeatedly with hexane and dried.

A solid catalyst component is obtained with characteristics similar to that of Example 2.

EXAMPLE 4

5.61 g (16.5 mmoles) of tetra n-butoxytitanium, 0.78 g (8.24 mmoles) of magnesium chloride and 100 ml of anhydrous n-heptane are fed under a nitrogen atmosphere into a 250 ml flask fitted with a reflux condenser, mechanical stirrer and thermometer. The mixture is heated to reflux temperature for 1 hour to completely dissolve the magnesium chloride.

10 g of hot-activated silica are introduced into the solution and left in contact for 2 hours under reflux conditions. The system is then evaporated to dryness by evaporating the solvent, to recover a granular solid.

1.04 g (10.9 mmoles) of anhydrous magnesium chloride dissolved in 260 ml of ethyl acetate dried over alumina are fed under a nitrogen atmosphere into a 500 ml flask fitted with a reflux condenser, mechanical stirrer and thermometer. The granular solid obtained as indicated is added to the solution and the mass heated to 60° C. for 1 hour. The solvent is then evaporated until a residual ethyl acetate quantity of 5–10% by weight on the magnesium chloride is left, to obtain a solid which is recovered and suspended in 53 ml of n-hexane and the suspension brought into contact with 13 ml of a 40 wt. % solution of aluminium ethyl sesquichloride (4.26 g, 17.2 mmoles) in n-decane. It is left in contact for 15 minutes at a temperature of 25° C., after which the solid is recovered and washed, and then dried under reduced pressure, as described in Example 1.

17 g of a catalyst component are obtained in the form of microspheroidal solid, containing 57.4% by weight of $SiO_2$ and having a Mg:Ti atomic ratio of 1.2:1, and which on X-ray analysis shows the characteristic peak of amorphous silica, and a sharp peak at about 7 degrees $2\theta$.

EXAMPLE 5

0.952 g (10.0 mmoles) of anhydrous magnesium chloride dissolved in 300 ml of ethyl acetate dried over alumina and 14.67 g of activated silica are fed under a stream of nitrogen into a 500 ml flask fitted with a reflux condenser, mechanical stirrer and thermometer and left in contact for 1 hour at 60° C. The ethyl acetate is partially evaporated to recover a granular solid. 4.26 g (12.53 mmoles) of tetra n-butoxytitanium, 2.00 g (6.24 mmoles) of hafnium tetrachloride, 0.238 g (2.5 mmoles) of anhydrous magnesium chloride and 200 ml of anhydrous n-heptane are fed under a nitrogen stream into a 500 ml flask fitted with a reflux condenser, mechanical stirrer, dropping funnel and thermometer. Reflux conditions are maintained until solubilization. The solid prepared as indicated above is added and reacted for 1 hour at 180° C. The system is evaporated to dryness by evaporating the solvent, to recover a granular solid. 40 ml of n-decane dried over alumina and this latter solid are fed under a nitrogen atmosphere into a 100 ml flask fitted with a reflux condenser, mechanical stirrer, dropping funnel and thermometer. 40 ml of a 40 wt. % solution of diisobutylaluminium chloride (13.12 g; 84.6 mmoles) in n-decane are fed dropwise into the mixture thus obtained, maintaining the temperature between 40° and 45° C.

After the addition the temperature is raised to 90° C. and contact is maintained for a further two hours.

The solid is finally separated, washed firstly with anhydrous n-decane until no chloride is present in the wash liquid, and then with n-pentane, and finally dried under a nitrogen stream at 40° C., to recover 22 g of catalyst component in the form of microspheroidal solid, containing 66% by weight of $SiO_2$ and having a Mg:Ti:Hf atomic ratio of 1:1:0.5, and which on X-ray analysis shows the characteristic peak of amorphous silica, and a sharp peak at about 7 degrees $2\theta$.

EXAMPLE 6

5.61 g (16.5 mmoles) of tetra n-butoxytitanium, 0.78 g (8.24 mmoles) of anhydrous magnesium chloride and 100 ml of anhydrous n-heptane are fed under a nitrogen stream into a 500 ml flask fitted with a reflux condenser, mechanical stirrer and thermometer. The mixture is reacted under reflux for 1 hour to completely dissolve the magnesium chloride. 10 g of activated silica are then introduced and left in contact for 2 hours under reflux conditions to recover a solid granulate.

1.04 g (10.2 mmoles) of anhydrous magnesium chloride dissolved in 260 ml of ethyl acetate dried over alumina are fed under a nitrogen stream into a 500 ml flask fitted with a reflux condenser, mechanical stirrer and thermometer. The solid prepared as indicated above is added and reacted for 1 hour at 60° C. The solvent is then evaporated until a residual ethyl acetate quantity of 5–10% by weight on the magnesium chloride is left, to recover a granular solid.

30 ml of n-decane dried over alumina and this latter solid are fed under a nitrogen atmosphere into a 100 ml flask fitted with a reflux condenser, mechanical stirrer, dropping funnel and thermometer. 51 ml of a 40 wt % solution of diisobutylaluminium chloride (16.73 g; 108 mmoles) in n-decane are fed dropwise into the mixture thus obtained, maintaining the temperature between 40° and 45° C.

After the addition the temperature is raised to 90° C. and contact is maintained for a further two hours. The solid is finally separated, washed firstly with anhydrous n-decane until no chloride is present in the wash liquid, and then with n-pentane, and finally dried under a nitrogen stream at 40° C., to recover 17 g of catalyst component in the form of microspheroidal solid, containing 57.4% by weight of $SiO_2$ and having a Mg:Ti atomic ratio of 1.2:1, and which on X-ray analysis shows the characteristic peak of amorphous silica, and a sharp peak at about 7 degrees $2\theta$.

EXAMPLE 7

The solid catalyst components prepared in Examples 1 to 4 are used in ethylene polymerization tests (tests 1 to 4). The polymerization is conducted in a 5 liter pressure vessel containing 2 liters of n-hexane, operating at a pressure of 10 bar in the presence of hydrogen, with a ratio of hydrogen pressure to ethylene pressure of 0.57:1 at a temperature of 90° C. for a time of 4 hours, using 300 mg of solid catalyst component and triethylaluminium as cocatalyst, with a molar ratio of triethylaluminium to titanium in the solid component of 100:1. Table 1 shows for each test the titanium content (% by weight) of the solid catalyst component, the polyethylene yield expressed as kg of polyethylene per g of solid catalyst component, the polymer density (ASTM D 1505) expressed in g/ml, the melt flow index (MFI) of the polymer (ASTM D 1238; 2.16 kg and 21.6 kg) expressed in g/10 min, and the apparent density of the polymer (ASTM D 1895) expressed in g/ml. In Table 1 tests 1a to 4a are conducted under the aforesaid conditions with the solid catalyst components of Examples 1 and 4 respectively, but with a hydrogen pressure/ethylene pressure ratio of 0.72:1.

Table 2 shows the particle size distribution in % by weight for each $\mu$ range, of the polyethylenes obtained in the polymerization tests of Table 1.

TABLE 1

| Test No. | Ti (% p) | Yield (kg/g) | Density (g/ml) | MFI (g/10 min) | App. D (g/ml) |
|---|---|---|---|---|---|
| 1 | 4.8 | 1.67 | 0.9653 | 10.7 | 0.30 |
| 1a | 4.8 | 0.87 | ND | 52.1 | 0.26 |
| 2 | 5.8 | 1.61 | 0.9647 | 8.5 | 0.31 |
| 3 | 4.2 | 0.83 | ND | ND | ND |
| 4 | 4.6 | 2.77 | 0.965 | 16.6 | 0.29 |
| 4a | 4.6 | 2.00 | ND | 57.9 | 0.30 |

ND = not determined

TABLE 2

| Test No. | Particle size distribution ($\mu$) | | | |
|---|---|---|---|---|
| | >2000 | <2000 >500 | <500 >250 | <250 |
| 1 | 0.5 | 95.0 | 3.9 | 0.6 |
| 1a | 0.3 | 88.0 | 9.4 | 2.3 |
| 2 | 0.9 | 80.9 | 8.9 | 9.4 |
| 3 | ND | ND | ND | ND |
| 4 | 0.2 | 89.6 | 7.6 | 2.6 |
| 4a | 0.3 | 87.7 | 10.3 | 1.7 |

ND = not determined

EXAMPLE 8

The catalyst component prepared in Example 4 is used in ethylene polymerization conducted in a 5 liter pressure vessel containing 2 liters of n-hexane, at a total pressure (hydrogen, ethylene and hexane) of 15 bar at 90° C. for a time of 2 hours, using 150 mg of solid catalyst component and triethylaluminium as cocatalyst, with a molar ratio of triethylaluminium to titanium in the solid component of 100:1. Table 3 shows the tests 4(a) to 4(e) conducted at various hydrogen pressures.

TABLE 3

| Test | 4(a) | 4(b) | 4(c) | 4(d) | 4(e) |
|---|---|---|---|---|---|
| P Hz (bar) | 4.1 | 4.5 | 4.9 | 5.3 | 5.7 |
| Yield (kg/g) | 5.7 | 4.9 | 4.5 | 4.3 | 3.1 |
| Density (g/ml) | 0.961 | 0.962 | 0.961 | 0.964 | 0.963 |
| MFI (2.16 kg) | 2.8 | 3.4 | 4.9 | 6.2 | 6.3 |
| MFI (21.6 kg) | 78.0 | 95.3 | 132.0 | 181.0 | 189 |
| MFR | 27.8 | 28.0 | 26.9 | 29.2 | 30.0 |
| App. dens. (g/ml) | 0.32 | 0.34 | 0.31 | 0.35 | 0.33 |

In the table, MFR indicates the melt flow ratio, determined as the ratio MFI (21.6 kg)/MFI (2.16 kg).

EXAMPLE 9

Ethylene polymerization tests are conducted with the catalyst of Example 5 [tests 5(a), 5(b) and 5(c)] using a 5 liter pressure vessel with 2 liters of n-hexane, with 300 mg of solid catalyst component and triisobutylaluminium as cocatalyst in a molar ratio to the titanium in the solid component of 100:1. The polymerization conditions and the test results are given in Table 4. The table also shows for the polyethylenes obtained in tests 5(b) and 5(c) the molecular weight, the molecular weight distribution and the intrinsic viscosity measured at 135° C. in trichlorobenzene solution.

TABLE 4

| Test | 5(a) | 5(b) | 5(c) |
|---|---|---|---|
| Temperature (°C.) | 75 | 75 | 85 |
| P total (bar) | 15 | 15 | 15 |
| P Hz (bar) | 7.8 | 8.0 | 7.2 |
| Time (hours) | 4 | 4 | 2 |
| Yield (kg/g) | 2.1 | 2.5 | 1.6 |
| MFI (2.16 kg) | 0.05 | 0.15 | 0.22 |
| MFI (21.6 kg) | 4.9 | 14.7 | 9.3 |
| MFR | 98 | 98 | 8.45 |
| Density (g/ml) | 0.954 | 0.956 | 0.950 |
| App. dens. (g/ml) | 0.38 | 0.30 | 0.27 |
| Mw × 10$^{-3}$ | ND | 281 | 316 |
| Mn × 10$^{-3}$ | ND | 21.1 | 22.3 |
| Mw/Mn | ND | 13.3 | 14.18 |
| Viscosity | ND | 2.64 | 2.97 | where: Mw = weight-average molecular weight;
Mn = number-average molecular weight;
Nd = not determined.

EXAMPLE 10

The procedure of test 4(b) of Example 8 is repeated, adding 160 g of 1-butene to the polymerization reactor. An ethylene/1-butene copolymer is obtained, with a yield of 8.9 kg per gram of solid catalyst component, density 0.928 g/ml, MFI (2.16 kg) 22.7 and MFR 8.0.

EXAMPLE 11

The procedure of test 4(b) of Example 8 is repeated, adding 100 g of 1-butene to the polymerization reactor. An ethylene/1-butene copolymer is obtained, with a yield of 6.9 kg per gram of solid catalyst component, density 0.941 g/ml, MFI (2.16 kg) 28.2 and MFR 10.16.

EXAMPLE 12

The catalyst of Example 4 is used in ethylene polymerization conducted in a 5 liter pressure vessel in the gaseous phase, with a total pressure of 20 bar and a hydrogen partial pressure of 6 bar, at 90° C. for a time of 2 hours, using 500 mg of solid catalyst component, 270 g of anhydrous sodium chloride and a molar ratio of triethylaluminium to titanium in the solid component of 60:1. An ethylene polymer is obtained with a yield of 1.3 kg per gram of solid catalyst component, and having an apparent density of 0.38 g/ml, an MFI (2.16 kg) of 6.0 and an MFR of 29.1. The particle size distribution of the polymer in percentage per $\mu$ range is as follows: >2000=0%; <2000>500=82%; <500>250=12.5%; <250=5.5% by weight.

EXAMPLE 13

The solid catalyst component is prepared as in Example 4 but with the difference that the silica is used as such (unactivated). The solid catalyst component obtained in this manner has a Ti:Mg:Cl ratio of 1.0:1.1:3.6 and a characteristic X-ray peak.

200 mg of the solid catalyst component and triethylaluminium (Al/Ti molar ratio=100:1) are used in the polymerization of ethylene at 15 bar in n-hexane (hydrogen/ethylene molar ratio=0.47/1) for 2 hours at 90° C.

An ethylene polymer is obtained with a yield of 3.6 kg per gram of solid catalyst component, and having a density of 0.961 g/ml, an apparent density of 0.31 g/ml, an MFI (2.16 kg) of 3.72 and an MFR of 27.9. The particle size distribution of the polymer in percentage per $\mu$ range is as follows: >2000=0.7%; <2000>1000=6.3%; <1000>500=91%;

<500>250=1.3%; <0.1%; <125>63=0.5%; <63=0.1% by weight.

EXAMPLE 14

6.60 g (19.4 mmoles) of tetra n-butoxytitanium, 0.917 g (9.63 mmoles) of magnesium chloride and 100 ml of anhydrous n-heptane are fed under a nitrogen atmosphere into a 250 ml flask fitted with a reflux condenser, mechanical stirrer and thermometer. The mixture is heated to reflux temperature for 1 hour to completely dissolve the magnesium chloride.

11.4 g of silica hot-activated by contact for 1 hour at 60° C. with a solution containing 150 ml of anhydrous n-hexane and 13 of a 20 wt % solution of magnesium butyl octyl in n-heptane are introduced into the solution and left in contact for 1 hour under reflux conditions. The system is then evaporated to dryness by evaporating the solvent, to recover a granular solid.

0.966 g (10.1 mmoles) of anhydrous magnesium chloride dissolved in 250 ml of ethyl acetate dried over alumina are fed under a nitrogen atmosphere into a 500 ml flask fitted with a reflux condenser, mechanical stirrer and thermometer. The granular solid obtained as indicated above is added to the solution and the mass heated to 60° C. for 1 hour. The solvent is then evaporated to obtain a granular solid. 10 g of the solid obtained in this manner are suspended in 60 ml of anhydrous n-hexane and the suspension brought into contact with 6.6 ml of a 49.5 wt % solution of aluminium ethyl sesquichloride (2.68 g, 10.8 mmoles) in n-hexane. It is left in contact for 15 minutes at a temperature of 25° C., after which the solid is recovered, washed, and then dried. About 10 g of a catalyst component are obtained in the form of microspheroidal solid, containing 60% by weight of $SiO_2$ and having a Mg:Ti atomic ratio of 1.6:1.

The solid catalyst component prepared in this manner is used in an ethylene polymerization test. The polymerization is conducted in a 5 liter pressure vessel containing 2 liters of n-hexane, operating at a pressure of 15 bar in the presence of hydrogen, with a ratio of hydrogen pressure to ethylene pressure of 0.47:1 at a temperature of 90° C. for a time of 1.5 hours, using 150 mg of solid catalyst component and triethylaluminum as cocatalyst, with a molar ratio of triethylaluminum to titanium in the solid component of 100:1.

Polyethylene is obtained with a yield of 3.7 kg of polymer per gram of solid catalyst component, the polyethylene obtained having the following characteristics:

| | |
|---|---|
| Density (ASTM D 1505): | 0.9630 g/ml |
| Apparent density (ASTM D 1895): | 0.37 g/ml |
| Melt flow index (ASTM D 1238; 2.16 kg): | 3.7 g/10 min |
| Melt flow ratio: | 30.4 |
| (Melt flow Index = MFI(21.6 kg)/MFI (2.16 kg) | |
| Particle size distribution (μ): | |
| >2000 | 0.9% by weight |
| <2000 >1000 | 4.2 by weight |
| <1000 >500 | 84.8 by weight |
| <500 >250 | 9.4 by weight |
| <250 | 0.7 by weight |

EXAMPLE 15

6.60 g (19.4 mmoles) of tetra n-butoxytitanium, 0.917 g (9.63 mmoles) of magnesium chloride and 100 ml of anhydrous n-heptane are fed under a nitrogen atmosphere into a 250 ml flask fitted with a reflux condenser, mechanical stirrer and thermometer. The mixture is heated to reflux temperature for 1 hour to completely dissolve the magnesium chloride.

11.4 g of silica hot-activated by contact for 1 hour at 60° C. with a solution containing 150 ml of anhydrous n-hexane and 13 ml of a 20 wt % solution of magnesium butyl octyl in n-heptane are introduced into the solution and left in contact for 1 hour under reflux conditions. The system is then evaporated to dryness by evaporating the solvent, to recover a granular solid. 0.966 g (10.1 mmoles) of anhydrous magnesium chloride dissolved in 250 ml of ethyl acetate dried over alumina are fed under a nitrogen atmosphere into a 500 ml flask fitted with a reflux condenser, mechanical stirrer and thermometer. The granular solid obtained as indicated above and 9.0 ml (13.2 g; 77.8 mmoles) of silicon tetrachloride are added to the solution and the mass heated to 60° C. for 1 hour. The solvent is then evaporated to obtain a granular solid. 10 g of the solid obtained in this manner are suspended in 60 ml of anhydrous n-hexane and the suspension brought into contact with 6.6 ml of a 49.5 wt % solution of aluminum ethyl sesquichloride (2.68 g, 10.8 mmoles) in n-hexane. It is left in contact for 15 minutes at a temperature of 25° C., after which the solid is recovered, washed, and then dried. About 10 g of a catalyst component are obtained in the form of microspheroidal solid, containing 60% by weight of $SiO_2$ and having a Mg:Ti atomic ratio of 2.1:1.0.

The solid catalyst component prepared in this manner is used in an ethylene polymerization test. The polymerization is conducted in a 5 liter pressure vessel containing 2 liters of n-hexane, operating at a pressure of 15 bar in the presence of hydrogen, with a ratio of hydrogen pressure to ethylene pressure of 0.47:1 at a temperature of 90° C. for a time of 2 hours, using 50 mg of solid catalyst component and triethylaluminium as cocatalyst, with a molar ratio of triethylaluminium to titanium in the solid component of 120:1.

Polyethylene is obtained with a yield of 17 kg of polymer per gram of solid catalyst component, the polyethylene obtained having the following characteristics:

| | |
|---|---|
| Density (ASTM D 1505): | 0.9596 g/ml |
| Apparent density (ASTM D 1895): | 0.32 g/ml |
| Melt flow index (ASTM D 1238; 2.16 kg): | 1.20 g/10 min |
| Melt flow ratio: | 33.7 |
| (Melt flow index = MFI (21.6 kg)/MFI (2.16 kg) | |
| Particle size distribution (μ): | |
| >2000 | 6.4% by weight |
| <2000 >1000 | 70.6 by weight |
| <1000 >500 | 21.6 by weight |
| <500 >250 | 0.9 by weight |
| <250 | 0.5 by weight |

EXAMPLE 16

The solid catalyst component prepared as described in Example 15 is used in a further ethylene polymerization test. The polymerization is conducted in a 5 liter pressure vessel containing 2 liters of n-hexane, operating at a pressure of 15 bar in the presence of hydrogen, with a ratio of hydrogen pressure to ethylene pressure of 1.3:1 at a temperature of 90° C. for a time of 2 hours, using 50 mg of solid catalyst component and triethylaluminium as cocatalyst, with a molar ratio of triethylaluminium to titanium in the solid component of 120:1.

Polyethylene is obtained with a yield of 8.1 kg of polymer per gram of solid catalyst component, the polyethylene obtained having the following characteristics:

| | |
|---|---|
| Density (ASTM D 1505): | 0.9667 g/ml |
| Apparent density (ASTM D 1895): | 0.32 g/ml |
| Melt flow index (ASTM D 1238; 2.16 kg): | 12.95 g/10 min |
| Melt flow ratio: | 21.9 |
| (Melt flow index = | |
| MFI (21.6 kg)/MFI (2.16 kg) | |
| Particle size distribution ($\mu$): | |
| >2000 | 1.3% by weight |
| <2000 >1000 | 50.0 by weight |
| <1000 >500 | 44.2 by weight |
| <500 >250 | 3.6 by weight |
| <250 | 0.9 by weight |

We claim:

1. A supported Ziegler-Natta catalyst active in ethylene polymerization and in the copolymerization of ethylene with alpha-olefins, consisting of:
   (A) a cocatalyst in the form of an organometallic compound of aluminium, and
   (B) a solid catalyst component containing titanium, magnesium, chlorine and alkoxy groups on a support, with a molar ratio of titanium to magnesium of between 1:1 and 1:6 and a titanium content of between 1 and 9% by weight (expressed as metal), obtained by:
   (i) impregnating a granular porous solid support with a solution of magnesium chloride $MgCl_2$ and a titanium tetraalcoholate $Ti(OR)_4$ (where R is a linear or branched $C_1$-$C_5$ alkyl radical) in a molar ratio of between 0.1:1 and 0.5:1, in a liquid aliphatic hydrocarbon, followed by evaporation of the hydrocarbon solvent, in order to deposit on the support a complex of formula $Ti(OR)_4.(0.1-0.5)MgCl_2$;
   (ii) impregnating the support treated in (i) with a solution of magnesium chloride in a liquid aliphatic ester, followed by evaporation of the solvent, to obtain on completion of the operation the deposition on the support of a complex of formula $Ti(OR)_4.(1-6)MgCl_2$; and
   (iii) activating the support treated in (ii) by contact with an alkyl aluminium chloride, operating at a temperature of between 10° and 100° C. for a time of between 10 minutes and 24 hours.

2. A catalyst as claimed in claim 1, characterised in that said cocatalyst (A) is selected from the group consisting of trialkylaluminiums, alkylaluminium hydrides and alkylaluminium halides containing from 1 to 5 carbon atoms in the alkyl portion, the molar ratio of aluminium in said cocatalyst (A) to titanium in the solid catalyst component (B) varying between 200:1 and 20:1.

3. A catalyst as claimed in claim 2, characterised in that said cocatalyst (A) is selected from the group consisting of trialkylaluminiums with from 2 to 4 carbon atoms in the alkyl portion.

4. A catalyst as claimed in claim 1, characterised in that the support for the solid catalyst component (B) is selected from the group consisting of granular, porous solids selected from the group consisting of olefinic polymers, styrene polymer, silica, and alumina and said support constituting between 40 and 85% by weight of said solid catalyst component (B).

5. A catalyst as claimed in claim 1, characterised in that said support is a microspheroidal silica support with a BET surface area of between 150 and 400 $m^2/g$, a total porosity >80% and a mean pore radius of between 50 and 200 Å, said silica being unactivated.

6. A catalyst as claimed in claim 1, characterised in that in stage (i) the support is impregnated with a solution containing magnesium chloride and titanium tetraalcoholate $Ti(OR)_4$ with a total concentration of these compounds of 5-10% by weight, at a temperature of between 40° and 100° C. for a time of between 1 and 5 hours, to deposit on the support a titanium quantity (considered as metal) of between 1 and 9% by weight in the solid catalyst component finally obtained.

7. A catalyst as claimed in claim 6, characterised in that the solvent used is selected from the group consisting of pentane, hexane and heptane, the titanium alcoholate is selected from the group consisting of tetra n-propoxytitanium, tetra n-butoxytitanium, tetra i-propoxytitanium and tetra i-butoxy titanium.

8. A catalyst as claimed in claim 1, characterised in that stage (ii) uses a solution of magnesium chloride in an ester selected from the group consisting of ethyl formate, methyl acetate, ethyl acetate, propyl acetate, isopropyl acetate and ethyl chloroacetate, operating at a temperature of 50°-75° C. for a time of the order of 1-5 hours until obtaining on the support a complex of formula $Ti(OR)_4.(1-6)MgCl_2$, and a residual ester quantity of between 0 and 20% by weight.

9. A catalyst as claimed in claim 8, characterised in that stage (ii) is operated to obtain on the support a complex of formula $Ti(OR)_4.(1-3)MgCl_2$.

10. A catalyst as claimed in claim 1, characterised in that in stage (i) and/or (ii) a silicon halide selected from the group consisting of silicon tetrahalides and halosilanes is additionally added in a quantity to obtain an atomic ratio of silicon to titanium of between 0.5:1 and 8:1.

11. A catalyst as claimed in claim 10, characterised in that the silicon halide is added in stage (ii) in a quantity to obtain a silicon:titanium atomic ratio of between 2.0:1 and 6.0:1.

12. A catalyst as claimed in claim 10, characterised in that said silicon halide is selected from the group consisting of silicon tetrachloride, trichlorosilane, vinyl trichlorosilane, trichloroethoxy silane and chloroethyl trichlorosilane.

13. A catalyst as claimed in claim 1, characterised in that in stage (iii) the treated support from stage (ii) is brought into contact with a solution of an alkylaluminium chloride in an aliphatic hydrocarbon, with a ratio of chlorine atoms in the alkylaluminium chloride to alkoxy groups in the solid of between 0.5:1 and 7:1.

14. A catalyst as claimed in claim 13, characterised in that said alkylaluminium chloride is selected from the group consisting of diethylaluminium chloride, ethylaluminium sesquichloride and isobutylaluminium chloride, operating at a temperature of between 20° and 90° C. for a time of between 15 minutes and 2 hours.

15. A catalyst as claimed in claim 1, characterised in that the support in stage (i) is impregnated with a solution containing additionally a halide, alcoholate or haloalcoholate of zirconium or hafnium, the quantity of zirconium or hafnium compound used being such as to obtain a molar ratio of [Ti+Zr (or Hf)] to Mg of between 1:1 and 1:6, and a molar ratio of Ti to Zr (or Hf) of between 1:0.5 and 1:2.

16. A catalyst as claimed in claim 2, characterized in that the alkyl aluminum halides are alkyl aluminum chlorides.

17. A catalyst as claimed in claim 2, characterized in that the molar ratio of aluminum in said co-catalyst (A) to titanium in the solid catalyst component (B) is between 150:1 and 50:1.

18. A catalyst as claimed in claim 1, characterized in that said support is a microspheroidal silica support with a BET surface area of between 150 and 400 square meters per gram, a total porosity greater than 80%, and a mean pore radius of between 50 and 200 Angstroms, said silica being activated by heating in an inert atmosphere to a temperature of between about 100° C. and 650° C. for a time of between 1 and 20 hours.

19. A catalyst as claimed in claim 1, characterized in that said support is a microspheroidal silica support with a BET surface area of between 150 and 400 square meters per gram, a total porosity greater than 80%, and a mean pore radius of between 50 and 200 Angstroms, said silica being activated by contact with an alkyl magnesium or an alkyl aluminum compound.

20. A catalyst as claimed in claim 6, characterized in that in stage (i) the support is impregnated at the reflux temperature of the solvent utilized.

21. A catalyst as claimed in claim 6, characterized in that the quantity of titanium deposited on the support is between 3 and 7% by weight (considered as metal).

22. A catalyst as claimed in claim 8, characterized in that the residual ester quantity is between 5 and 10% by weight of the weight of magnesium chloride.

23. A catalyst as claimed in claim 11, characterized in that said silicon halide is selected from the group consisting of silicon tetrachloride, trichlorosilane, vinyl trichlorosilane, trichloroethoxy silane and chloroethyl trichlorosilane.

24. A catalyst as claimed in claim 23, characterized in that the silicon halide is silicon tetrachloride.

25. A catalyst as claimed in claim 15, characterized in that the molar ratio of [Ti+Zr (or Hf)] to Mg is between 1:1 and 1:3.

26. A catalyst as claimed in claim 15, characterized in that the molar ratio of Ti to Zr (or Hf) is between 1:1 and 1:2.

* * * * *